Figure 1:
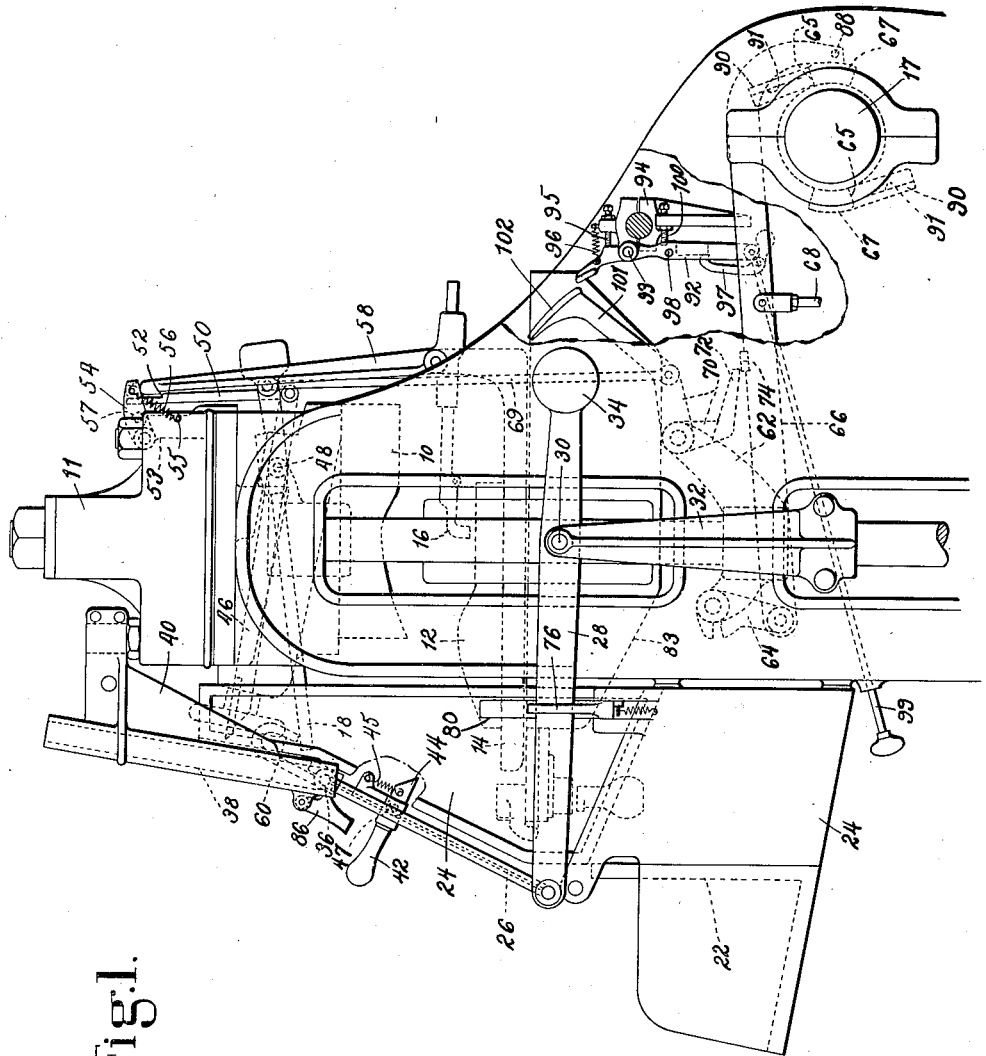

Patented Apr. 15, 1941

2,238,290

UNITED STATES PATENT OFFICE 2,238,290

SAFETY DEVICE FOR POWER-OPERATED MACHINES

Arthur Alan Rivington and Wilfrid Thomas Minett, Leicester, England, assignors to United Shoe Machinery Corporation, Borough of Flemington, N. J., a corporation of New Jersey Application July 31, 1939, Serial No. 287,502 In Great Britain August 18, 1938

10 Claims. (Cl. 192—134)

This invention relates to power operated machines, and more particularly to safety devices for such machines. The invention is herein illustrated as embodied in a sole-molding machine of the type disclosed in Letters Patent of the United States No. 1,637,506, granted August 2, 1927, upon an application of R. B. Woodcock and Ernest Hope, although it is to be understood that the invention is not limited to machines of the particular type illustrated or to machines for molding soles.

Machines of the above-mentioned type are provided with means for operating upon work pieces which are presented to the operating means and removed therefrom by the operator. In supplying and removing the work pieces, the operator's hands are frequently in a dangerous position with respect to the operating means and if not removed before the power operation of the machine begins, considerable injury may result to the operator. In order to insure against any danger of injury to the operator the present invention has for one of its objects to provide improved guard means for closing the space in front of the operating means to prevent access thereto by the hand or hands of the operator during the power operation of the machine. For the purposes in view the illustrated machine is provided with a plurality of guard members comprising fixed guards arranged partially to close the space in front of the machine at opposite sides of the machine, a guard arranged to bridge the space between the fixed guards and movable from an inoperative position into position to close the space, and mechanism movable to start the machine in response to movement of the movable guard into closed or protective position. As herein shown, the movable guard is movable heightwise of the machine from an elevated position downwardly into position to close the space between the fixed guards in front of the operating means, and there is further provided a member movable in opposite directions respectively to start and to stop the machine, mechanism for moving the member in the direction to start the machine, and a device movable with the movable guard for operating this mechanism to move the member only after the movable guard has substantially completed its movement into closed position. Preferably and as illustrated, means is provided for locking the movable guard in closed position and for releasing it substantially at the end of the operation of the machine, means, herein shown as weighted levers, being provided for returning the movable guard to its elevated position and for maintaining it in that position. The arrangement is accordingly such that the guards effectively close the space in front of the operating means, thereby protecting the operator against the possibility of injury during the power operation of the machine while providing ample space for the removal and replacement of the work pieces at the end of each operation of the machine.

In accordance with further features of the invention means is provided for locking the above-mentioned member which is movable in opposite directions respectively to start and to stop the machine against movement in the direction to start the machine in the event of the machine running past its normal stopping position, and means for unlocking the member for movement in that direction only when the movable guard is in closed position. In the illustrated machine, automatic means is provided for moving the above-mentioned member in the direction to stop the machine, this member receiving an abnormal movement in that direction in the event of the machine running past its normal stopping position. Carried by the member is a latch which is arranged in response to abnormal movement of the member to engage a pin carried by a lever which may be swung by the operator to disconnect the latch and said pin to unlock the member for movement in the direction to start the machine only when the movable guard is in closed position.

The above and other features of the invention, including novel means for releasing work clamping means for movement toward work clamping position in response to movement of the movable guard toward closed position, and various novel details of construction and combinations of parts will now be more particularly set forth by reference to the accompanying drawings and pointed out in the claims.

Figure 2:
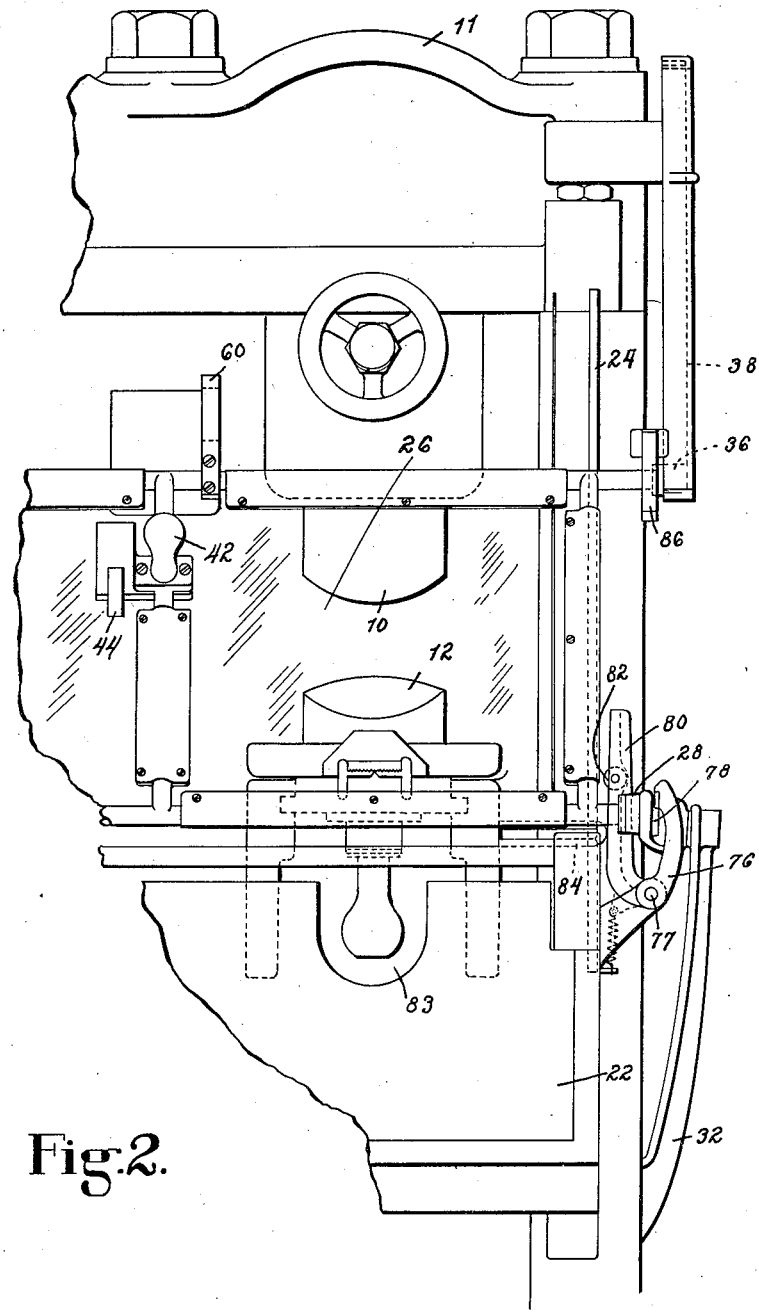

In the drawings,

Fig. 1 is a view in right-hand side elevation of as much of a machine of the type illustrated in the above-mentioned Letters Patent as it is necessary to refer to for an understanding of the present invention, with novel features of the invention embodied therein; and Fig. 2 is a view in front elevation of the right-hand portion of the machine shown in Fig. 1.

The machine herein shown, like the machine of the Letters Patent mentioned, is provided with two pairs of molds, each pair comprising an upper mold 10 adjustably mounted upon a fixed crosshead 11 and a lower sole-supporting mold 12 horizontally movable from a sole-receiving position (Fig. 1) rearwardly into alinement with the upper mold 12 in guideways formed in a vertically movable mold carrier 14. The carriers 14 are operated alternately to move the lower molds toward and from the upper molds into and out of pressure-applying relation thereto, and at the end of each sole-pressing operation each lower mold is moved relatively to its associated carrier 14 forwardly to its initial starting position. The machine is provided as heretofore with means comprising a lever 16 for clamping a positioned sole on each lower mold 12, with a lever 18 located above the upper molds 10 and extending forwardly toward the operator for controlling another lever which starts the machine, and with means for automatically stopping the machine after each half-revolution of its crank shaft 17 with one pair of molds in pressure-applying positions and with the molds of the other pair in the positions indicated in Fig. 1.

For purposes of the present invention there is provided a fixed guard 22 in the form of a work tray arranged to extend across the whole width of the front of the machine below the lower molds 12 to close that space, and fixed guards 24 that extend upwardly, one at each side of the machine, from the guard 22 to a point above the upper molds 10, the fixed guards 24 thus partially closing the space in front of the machine at the opposite sides. Extending across the front of the machine above the tray guard 22 to bridge the space between the fixed guards 24 is a rectangular, transparent guard 26 which is movable from an elevated position downwardly into position to close the space between the fixed guards 24 in front of the lower and upper molds during the power operation of the machine. The guard 26 is pivotally connected at its lower end to the forward ends of a pair of levers 28 each of which is pivotally connected at 30 to a bracket 32, one at each side of the machine. At their rear ends the levers 28 are provided with weights 34 of sufficient size slightly more than to counterbalance the weight of the guard 26, the weights 34 tending to swing the levers in the direction to move the guard 26 upwardly to its initial elevated position and to maintain it in that position while the operator removes a sole from one of the lower molds 12 and positions another sole thereon. The guard 26 is guided for upward and downward movement by rolls 36 carried by the guard, one at each side of its upper end, the rolls extending into guideways 38 formed in brackets 40 fast to the upper portion of the frame of the machine, the guideways 38 being preferably inclined rearwardly at a small angle to the vertical.

The illustrated machine is provided with means, not herein shown since it is substantially like that fully disclosed in the prior Letters Patent above mentioned, for operating each sole-clamping member 16 to clamp a sole on its associated lower mold 12 when the lower mold is in its forward sole-receiving position, the member 16 acting to hold the sole against displacement relatively to the lower mold during the relative movements of the lower and upper molds to apply pressure to the sole and then to release the sole from pressure and being moved out of clamping relation to the sole in response to the forward movement of the lower mold to its initial position after each sole-pressing operation. In the illustrated construction, means is provided for holding each lever 16 initially in a raised position and for releasing it for movement toward its associated lower mold into position to clamp a sole thereon in response to downward movement of the guard member 26. As shown, the guard member 26 is provided with a handle 42 by means of which the operator may move it downwardly into position to close the space in front of the lower and upper molds between the fixed guards 24 and above the tray guard 22. Carried by the handle 42 is a pawl 44 upheld by a spring 45 with the pawl in engagement with a shoulder 47 on the handle. A forwardly extending lever 46 is pivotally connected at 48 to the machine frame and has pivotally connected to it at its rear end an upwardly extending rod 50 provided near its upper end with a shoulder 52. A bracket 53 fast to the frame of the machine has pivotally connected thereto a latch 54 between which and a pin 55 projecting from the frame there extends a spring 56 which tends to impart downward swinging movement to the latch 54 and to hold it with a stop, illustrated as a pin 57, carried by the latch in engagement with a portion of the frame. Each sole-clamping lever 16 has associated therewith an upwardly extending arm 58 fixed against movement relatively to the lever 16. Initially the latch 54 acts by engagement with the upper end of each arm 58 to hold its associated sole-clamping lever 16 against movement toward its associated lower mold 12 into sole-clamping position. Substantially at the beginning of the downward movement of the guard member 26 the pawl 44 engages and swings the lever 46 in a direction to lift the rod 50. As the rod 50 is thus raised, the shoulder 52 on the rod engages the latch 54 and swings it upwardly into a position in which it no longer obstructs forward movement of the arm 58, thus releasing that clamping member 16 which is out of sole-clamping position for movement toward its associated lower mold 12 to clamp a positioned sole thereon. In the return of the parts to starting positions, it will be understood that as the arm 58 is swung reversely the spring 56 acts to swing the latch 54 downwardly in position again to prevent forward movement of the arm 58 with the clamping member 16 out of sole-clamping position, the spring 45 permitting swinging movement of the pawl 44 to pass the forward end of the lever 46 in the upward movement of the guard member 26.

Carried by the guard member 26 is a hook-shaped device 60 which, near the end of the downward movement of the guard member into closed or protective position, is arranged to engage and swing the lever 18, about its pivotal connection at 48 to the frame, in a counterclockwise direction (Fig. 1). A bracket 62 fast to one of the vertical rods of the machine has pivotally connected thereto a short link 64 to which there is pivotally connected a rearwardly extending lever 66 movable in opposite directions respectively to start and to stop the machine. The rear end portion of the lever 66 is curved downwardly, as shown, to engage the end face 65 of one or the other of a pair of oppositely disposed abutments 67 on the main shaft 17, one or the other of the abutments acting to hold the lever 66 against downward movement in the direction to start the machine at the end of each half-revolution of the main shaft 17. The lever 66 is connected by a link 68 to clutch mechanism, which is not herein shown since it is substantially like that provided heretofore in machines of the illustrated type. At its rear end the lever 18 is connected by a link 69 to one arm of a bell-crank lever 70 which is pivotally connected to the bracket 62 and has pivotally connected to its other arm a pawl 72 arranged to engage a trip plate 74 fast on the lever 66. Counterclockwise swinging movement of the lever 18 acts through the link 69 to swing the lever 70 in a direction to impart rearward movement to the pawl 72. As the pawl is thus moved, it acts by engagement with the trip plate 74 to move the lever 66 rearwardly far enough to carry its hook-shaped rear end out of engagement with either one of the abutments 67, thus permitting the lever 66 to swing downwardly into the position shown in Fig. 1 to trip the clutch. Projecting from the end of the downwardly curved rear portion of the lever 66 is a pin 88 which, near the end of each half-revolution of the main shaft 17, is arranged to be engaged by one or the other of a pair of tangentially projecting arms 90 on the shaft 17, each arm 90 being provided with a projection 91 for engaging the pin to swing the lever 66 upwardly and forwardly to bring it again into position to engage one of the abutments 67 and to disconnect the clutch to stop the power operation of the machine, the length of the projections 91 being such that they can pass over the pin 88 when the lever 66 is in engagement with one or the other of the abutments 67.

When the guard member 26 has been moved downwardly substantially into position to close the space in front of the molds 10, 12 between the fixed guards 24, it is latched down by means of a spring-operated pawl 76 arranged to engage a projection 78 on one of the levers 28. The pawl 76 is pivotally connected at 77 to one of the fixed guard members 24 and has an upwardly extending arm 80 carrying a roll 82. Formed on the crosshead 83 that supports the lower mold 12 of the right-hand pair is a projection 84 which is arranged to engage the roll 82 as the lower mold 12 is moved upwardly toward its cooperating upper mold 10 or downwardly to its lowermost position. Engagement of the projection 84 with the roll 82 acts to swing the pawl 76 in the direction to release the levers 28 for swinging movement in the direction to return the guard member 26 to its uppermost position, the arrangement of the parts being such that the guard member 26 is thus unlatched in each half-revolution of the machine after one of the lower molds has been moved substantially into pressure-applying relation to its associated upper mold and too late in the movement of the lower mold to permit the operator's hand to be caught between it and the upper mold. Pivotally connected to the bracket 40 is a short arm 86 which, when it is in the position shown in Fig. 1, is arranged to act as a stop to limit upward movement of the guard member 26 by engagement with the forward end of one of the levers 28, the arrangement being preferably such that when one of the levers 28 is in engagement with the stop the guard member 26 is raised sufficiently to provide ample room for the operator to mount a sole on either one of the lower molds 12 or to remove a sole therefrom. In order that the upper molds 10 may be replaced without interference between them and the guard member 26, the arm 86 may be swung upwardly to permit the guard member to be raised into a higher position in which it will not interfere with the removal and replacement of the upper molds.

The illustrated machine is further provided with means for preventing re-engagement of the clutch in the event of the machine overrunning. This means, as herein shown, comprises a lever 92 that is pivoted at 93 to a bracket 94 fast to the frame of the machine and is held in engagement with an adjustable stop illustrated as a screw 95 carried by the bracket 94 by means of a spring 96. As previously pointed out, near the end of each half-revolution of the main shaft 17 one of the tangentially projecting arms 90 acts by engagement with the pin 88 to lift the lever 66, thereby disengaging the clutch, and to move the lever forwardly into position again to engage one of the abutments 67, the lever 66 being then held by the abutment against movement in the direction to start the machine. If, however, by reason of the failure of the usual brake, for example, the main shaft 17 is rotated past its usual stopping position, the abutment 67 that is uppermost in the machine may be moved into a position in which it will no longer be effective to hold the lever 66 against movement in the direction to start the machine. It will be evident that as the abutment is thus moved past its usual stopping position it acts to impart a further upward swinging movement to the lever 66. Carried by the lever 66 is a latch, illustrated as a weighted arm 97 provided with a hook-shaped upper end which in response to continued upward swinging movement of the lever 66 by one or the other of the abutments 67 is arranged to hook over the top of a pin 98 projecting from the lever 92 and to hold the lever 66 against movement in the direction to start the machine. Thus, any danger of the lever 66 falling off one of the abutments 67 into clutch-engaging position, due to continued rotation of the main shaft 17 past its usual stopping position, is avoided. For unlatching the lever 66 there is pivotally connected to the lower end of the lever 92 a forwardly extending rod 99 having a handle formed on its outer end. By rearward movement of the rod 99, the operator may swing the lever 92 in a counterclockwise direction, as viewed in Fig. 1, about its pivotal connection at 93 to the bracket 94. As the lever 92 is thus swung, an adjustable stop, illustrated as a screw 100 carried by the bracket 94, is arranged to engage the hook-shaped end of the arm 97 to permit the pin 98 to be moved out of engagement with the arm to unlatch the lever 66. In order to prevent any danger of injury to the operator, such as might occur if the parts were in such positions that unlatching of the lever 66 would permit it to move downwardly into clutch-tripping position and thus cause the operation of the machine to be repeated with the space in front of the molds open, means is provided for preventing unlatching of the lever 66 if the guard member 26 is in raised position. As shown, the bell-crank lever 70 is provided with an upwardly extending arm 101 having an elongated end portion 102 which, when the guard member 26 is in raised position, is positioned in front of the upper end of the lever 92, thus preventing swinging movement of the lever 92 by rearward movement of the rod 99 in the direction to unlatch the lever 66. Accordingly, it will be necessary for the operator, in order to unlatch the lever 66, to move the guard member 26, if it is in raised position, downwardly into its lowermost position, this movement of the guard member acting through the link 69 to swing the bell-crank lever 70 into a position in which its arm 101 will no longer obstruct swinging movement of the lever 92 in the direction to unlatch the lever 66.

In the operation of the machine, the operator after positioning a sole on that lower mold 12 that is in its forward sole-receiving position grasps the handle 42 and moves the movable guard 26 downwardly into position to close the space in front of the upper and lower molds 10 and 12 between the fixed guards 24 and above the tray guard 22. As the guard 26 is moved downwardly the lever 46 is first swung by engagement of the pawl 44 therewith in the direction to lift the latch 54, thereby releasing the appropriate work-clamping member 16 for movement into position to clamp the sole which has been positioned on the lower mold 12 by the operator, after which the lever 18 is swung by engagement of the device 60 therewith in the direction to cause the pawl 72 by engagement with the trip plate 74 to move the starting lever 66 out of engagement with one of the abutments 67, thereby releasing the lever 66 for movement in the direction to start the machine, the lever 66 being thus released substantially at the time when the guard 26 is moved into closed or protective position. The guard 26 is locked in closed position by engagement of the pawl 76 with the abutment 78 on one of the levers 28. In the upward movement of the lower mold 12 and substantially at the time when the sole is moved into engagement with the upper mold 10, the guard 26 is released for movement to its initial elevated position as the arm 80 is swung by engagement of the abutment 84 with the roll 82 in the direction to move the pawl 76 out of engagement with the abutment 78. It will be evident that movement of the guard 26 toward its initial elevated position to expose the space in front of the lower and upper molds occurs too late in the cycle to permit the hand of the operator to be caught between either pair of molds. With a sole under pressure by one pair of molds and the lower mold of the other pair in the position indicated in Fig. 1, the lever 66 is swung reversely in the direction to stop the machine by the engagement of one of the inclined arms 90 with the pin 88 carried by the lever 66, the arm acting also to move the lever 66 forwardly and to position it for engagement with the abutment 67 associated with that arm. With the machine in stopped position, the operator removes a molded sole from one of the lower molds 12 and positions another sole thereon, after which the operation above described may be repeated. In the event of the machine running past its normal stopping position by failure, for example, of the usual brake, the abutments 67 will be rotated past their normal stopping positions, and this will cause a further swinging movement to be imparted to the lever 66. If the abutments are rotated far enough past their normal stopping positions so that there is danger of the lever 66 falling off the abutment engaged by the lever, the latch 97 carried by the lever 66 will engage the pin 98 projecting from the lever 92, thus causing the lever 66 to be locked against movement in the direction to start the machine. If this occurs, it will be necessary for the operator, if the guard 26 is in its elevated position, to move the guard 26 downwardly into closed position, thereby causing the arm 101 of the bell-crank lever 70 to be swung upwardly into position to permit swinging movement of the lever 92 in the direction to unlatch the lever 66 by rearward movement of the rod 99.

Having described the invention, what we claim as new and desire to secure by Letters Patent of the United States is:

1. In a power-operated machine, the combination with means for operating upon work, of a guard arranged to extend across the front of the machine and movable heightwise of the machine into and out of operative position in front of said operating means, a lever movable in opposite directions respectively to start and to stop the machine, a pair of arms arranged alternately to move said starting lever in the direction to stop the machine, an abutment associated with each of said arms for holding said starting lever against movement in the direction to start the machine, and means for moving said starting lever out of engagement with either one of said abutments in response to movement of said guard into operative position.

2. In a power-operated machine, the combination with means for operating upon work, of means movable to start the machine comprising a guard movable from an inoperative position into position in front of said operating means, and means controlled by movement of the machine past its normal stopping position for preventing the starting of the machine thereafter in response to the movement of the guard.

3. In a power-operated machine, the combination with means for operating upon work, of a member movable in opposite directions respectively to start and to stop the machine, a guard movable from an inoperative position into position in front of said operating means, mechanism operative in response to movement of said guard into operative position for moving said starting member in the direction to start the machine, and means controlled by movement of the machine past its normal stopping position for preventing such movement of the starting member in response to movement of said guard into operative position.

4. In a power-operated machine, the combination with means for operating upon work, of a guard movable from an inoperative position into position in front of said operating means, a member movable in a direction to start the machine in response to said movement of the guard, means including an abutment for moving said starting member in the opposite direction to stop the machine, and automatic means controlled by movement of said abutment past its normal stopping position for locking said starting member against movement in the direction to start the machine.

5. In a power-operated machine, the combination with means for operating upon work, of a member movable in opposite directions respectively to start and to stop the machine, automatic means for moving said member in the direction to stop the machine, means controlled by movement of said automatic means past its normal stopping position for locking said starting member against movement in the direction to start the machine, a guard movable from an inoperative position into position in front of said operating means, and means for preventing the unlocking of said starting member when the guard is in its inoperative position.

6. In a power-operated machine, the combination with means for operating upon work, of a member movable in opposite directions respectively to start and to stop the machine, automatic means for moving said member in the direction to stop the machine, means controlled by movement of said automatic means past its normal stopping position for locking said starting member against movement in the direction to start the machine, a guard movable from an inoperative position into position in front of said operating means, manually-operated means for unlocking said starting member, and means controlled by the movement of the guard for rendering said manually-operated means inoperative when the guard is in inoperative position.

7. In a power-operated machine, the combination with means for operating upon work, of a guard movable from an elevated position downwardly into position in front of said operating means, a lever movable to start the operation of the machine in response to movement of the guard into operative position, means for locking the guard in operative position and for releasing it substantially at the end of the operation of the machine, means for moving said starting lever in the direction to stop the machine, a latch controlled by movement of said last-named means past its normal stopping position for locking the starting lever against movement in the direction to start the machine, and means for preventing unlocking of the starting lever when the guard is in an elevated position.

8. In a power-operated machine, the combination with means for operating upon work, of a guard movable from an elevated position downwardly into position in front of said operating means, a lever movable to start the operation of the machine in response to downward movement of the guard into operative position, means for locking the guard in operative position and for releasing it substantially at the end of the operation of the machine, means for moving said starting lever in the direction to stop the machine, a latch controlled by movement of said last-named means past its normal stopping position for locking said starting lever against movement in the direction to start the machine, a member movable by the operator to unlatch said starting lever, and means for locking said member against operative movement when the guard is in an elevated position and for releasing it for such movement in response to movement of the guard into closed position.

9. In a power-operated machine, the combination with members relatively movable to apply pressure to a work piece, of work-clamping means movable into and out of work-clamping position, means for holding said work-clamping means initially out of work-clamping position, a guard movable relatively to said work-clamping means from an inoperative position into position in front of said pressing members, and means operative in response to said movement of the guard for releasing said work-clamping means for movement toward work-clamping position.

10. In a power-operated machine, the combination with members relatively movable to apply pressure to a work piece, of work-clamping means comprising a member movable relatively to said pressing members into and out of work-clamping position, a latch for holding said clamping member initially out of work-clamping position, a guard movable from an elevated position downwardly into position in front of said pressing members, and means operative in response to downward movement of said guard for operating said latch to release said work-clamping member.

ARTHUR ALAN RIVINGTON.
WILFRID THOMAS MINETT.